United States Patent
Cipriani et al.

(10) Patent No.: US 11,307,020 B2
(45) Date of Patent: Apr. 19, 2022

(54) SAMPLE THICKNESS MEASURING ARRANGEMENT AND METHOD FOR MEASURING A THICKNESS OF A SAMPLE AT CRYOGENIC TEMPERATURE BY INTERFEROMETRY USING A CRYOSTAT

(71) Applicant: EUROPEAN MOLECULAR BIOLOGY LABORATORY, Heidelberg (DE)

(72) Inventors: Florent Cipriani, Claix (FR); Gergely Papp, Grenoble (FR)

(73) Assignee: EUROPEAN MOLECULAR BIOLOGY LABORATORY, Heidelberg (DE)

( * ) Notice: Subject to any disclaimer, the term of this patent is extended or adjusted under 35 U.S.C. 154(b) by 0 days.

(21) Appl. No.: 17/273,514

(22) PCT Filed: Sep. 13, 2019

(86) PCT No.: PCT/EP2019/074578
§ 371 (c)(1),
(2) Date: Mar. 4, 2021

(87) PCT Pub. No.: WO2020/058140
PCT Pub. Date: Mar. 26, 2020

(65) Prior Publication Data
US 2021/0341282 A1 Nov. 4, 2021

(30) Foreign Application Priority Data
Sep. 18, 2018 (EP) ..................................... 18195081

(51) Int. Cl.
*G01B 11/06* (2006.01)
*G01N 1/42* (2006.01)

(52) U.S. Cl.
CPC ............... *G01B 11/06* (2013.01); *G01N 1/42* (2013.01)

(58) Field of Classification Search
CPC ....................................................... G01B 11/06
(Continued)

(56) References Cited

U.S. PATENT DOCUMENTS

| 5,237,825 A | * | 8/1993 | Menzi | ........................ | F17C 3/08 |
| | | | | | 62/49.1 |
| 6,413,252 B1 | * | 7/2002 | Zavislan | ................ | A61B 18/02 |
| | | | | | 359/375 |

(Continued)

FOREIGN PATENT DOCUMENTS

| DE | 112015001149 T5 | * | 11/2016 | ............. | F25D 21/04 |
| DE | 102017105218 A1 | * | 9/2017 | ............. | F16F 15/06 |
| EP | 2 381 236 A1 | | 10/2011 | | |

OTHER PUBLICATIONS

Lynceetec transmission DHM. (n.d.), retrieved from https://www.lynceetec.com/transmission-dhm, retrieved on Mar. 4, 2021.
(Continued)

*Primary Examiner* — Tarifur R Chowdhury
*Assistant Examiner* — Omar H Nixon
(74) *Attorney, Agent, or Firm* — Birch, Stewart, Kolasch & Birch, LLP (57) ABSTRACT

A sample thickness measuring arrangement and method for measuring a thickness of a sample are proposed. The sample thickness measuring arrangement comprises a sample thickness measuring unit for measuring the thickness of a sample based on interferometry. Furthermore, it comprises a cryostat comprising a coolant reservoir and a sample observation unit for observing characteristics of a sample. The sample observation unit comprises a tube enclosing an observation volume, a thermal tube insulation layer and a window arrangement. The tube is open at a distal end and at
(Continued)

a proximal end. The distal end of the tube is arranged within a storage volume of the coolant reservoir. The tube has two lateral openings in its tube walls at opposing sides with regards to the observation volume. The tube walls are covered at their external side with the thermal tube insulation layer having two openings adjacent to the openings in the tube walls. The window arrangement comprises two opposing panes, each pane being arranged at one of the openings in the thermal insulation layer. The panes are transparent to light of a laser beam. The proposed approach enable precise and stable sample thickness measurements at cryogenic temperatures.

20 Claims, 2 Drawing Sheets

(58) Field of Classification Search
USPC .......................................................... 356/630
See application file for complete search history.

(56) References Cited

U.S. PATENT DOCUMENTS

| 9,927,336 | B2 | 3/2018 | Meisberger et al. | |
| 2008/0283775 | A1* | 11/2008 | Doak | A01N 1/0257 |
| | | | | 250/492.1 |
| 2012/0201268 | A1 | 8/2012 | Boyd et al. | |
| 2014/0069119 | A1* | 3/2014 | Katkov | A01N 1/0236 |
| | | | | 62/51.1 |
| 2019/0041308 | A1* | 2/2019 | Schryver | A01N 1/0257 |

OTHER PUBLICATIONS

Razinkov et al. "A new method for vitrifying samples for cryoEM". Journal of Structural Biology., 2016, vol. 195, pp. 190-198, https://frankiab.cpmic.columbia.edu/franklab/Learning_Materials/Meeting_5_Specimen-Support/Papers/Razinkov_2016-Nanowire_grids.pdf.
Vitrobot. (n.d.). Retrieved from https://www.fei.com/products/vitrobot-for-life-sciences/. retrieved on Mar. 4, 2021.

* cited by examiner

SAMPLE THICKNESS MEASURING ARRANGEMENT AND METHOD FOR MEASURING A THICKNESS OF A SAMPLE AT CRYOGENIC TEMPERATURE BY INTERFEROMETRY USING A CRYOSTAT

FIELD OF THE INVENTION

The present invention relates to a sample thickness measuring arrangement and to a method for measuring a thickness of a sample to be examined using e.g. cryo electron microscopy. Furthermore, the invention relates to a cryostat to be used in such arrangement or method.

BACKGROUND OF THE INVENTION

Electron microscopy may be used to examine extremely small structures or particles for example in a nanometre range. In order to enable examining biological samples such as biological cells, cryo electron microscopy (CryoEM) has been developed. Cryo electron microscopy is a form of transmission electron microscopy (TEM), in which biological samples are examined at cryogenic temperatures of below −123° C. (150 K). In cryo electron microscopy, samples are generally quick-frozen and thereby vitrified before being inserted into a transmission electron microscope.

Typically, CryoEM data are obtained from sample particles embedded in a vitrified solution such as amorphous ice set on a CryoEM sample holder. Therein, the CryoEM sample holder may consist for example of a 3 mm diameter 10 to 20 micrometre thickness metal grid made e.g. of copper, gold or another metal and being covered for example with a holey carbon film. The carbon film may have a thickness of for example about 10 nm and may include a matrix of micron-sized holes that holds a sample solution. The sample solution may typically comprise the samples to be examined and may further include water, salts and/or cryo-protectant. Upon sample preparation, the sample solution may be dispensed on a grid of a CryoEM sample holder, may then be blotted and may finally be vitrified by rapidly cooling it for example in liquid ethane. An optimal sample thickness may be around 100 nm, which may allow having in the holes of the CryoEM sample holder a single layer of sample particles embedded in the vitrified ice.

Conventional sample preparation techniques for CryoEM examination may involve a number of manual steps and may suffer from poor reproducibility. Particularly, it may be difficult to prepare and/or identify samples having a correct thickness to enable examining single particles or cells during CryoEM examination.

SUMMARY OF THE INVENTION AND OF EMBODIMENTS

Thus, there may be a need for a sample thickness measuring arrangement and for a method for measuring a thickness of a sample, which may enable measuring a thickness of the sample with high precision and/or high reproducibility and/or which may thereby enable simple, reliable and/or cost effective sample preparation and/or quality control e.g. for application in CryoEM. Furthermore, there may be a need for a cryostat, which may be beneficially applied in such sample thickness measuring arrangement or method for measuring a thickness of a sample.

Those needs may be met with the subject-matter of the independent claims. Further exemplary embodiments may be derived from the dependent claims and the following description.

According to a first aspect of the present invention, a cryostat comprising a coolant reservoir for storing liquid coolant and a sample observation unit for observing characteristics of a sample is proposed. Therein, the coolant reservoir comprises a vessel enclosing a storage volume with walls of the vessel being thermally insulated with a thermal reservoir insulation layer such as to enable storing liquid coolant at temperatures below 150 K. The sample observation unit comprises a high thermal conductivity tube, a thermal tube insulation layer and a window arrangement. The tube has tube walls enclosing a tube volume including an observation volume. The tube is open at a distal end and at a proximal end. The distal end of the tube is arranged within the storage volume of the coolant reservoir. The tube has two lateral openings in its tube walls at opposing sides with regards to the observation volume. The walls of the tube are covered at their external side with the thermal tube insulation layer. The thermal tube insulation layer has two openings adjacent to the openings in the tube walls. The window arrangement comprises two opposing windows with panes, each pane being arranged at one of the openings in the thermal insulation layer. The panes are transparent to laser light.

According to a second aspect of the invention, a sample thickness measuring arrangement is proposed. The sample thickness measuring arrangement comprises a cryostat according to an embodiment of the first aspect of the invention and furthermore comprises a sample thickness measuring unit being arranged and configured for transmitting a laser beam through the window arrangement of the sample observation unit and for determining the sample thickness based on interferometry measurements with the transmitted laser beam.

According to a third aspect of the invention, a method for measuring a thickness of a sample is proposed. The method comprises at least the following steps, preferably in the indicated order: a cryostat according to an embodiment of the first aspect of the invention is provided. A gentle, low temperature coolant gas flow is then established through the tube of the sample observation unit of the cryostat. Then, the sample is inserted into the observation volume of the sample observation unit using e.g. a tweezer. Finally, the thickness of the sample is measured by transmitting a laser beam through the window arrangement of the sample observation unit and determining the sample thickness based on interferometry measurements with the transmitted laser beam.

Principles underlying embodiments of the present invention may be seen as being based, inter-alia, on the following ideas and observations, however without restricting the scope of the invention.

As already briefly indicated in the above introductory portion, precise sample preparation may be essential to obtain good CryoEM measurement results. Among various criteria that define a good sample grid, such criteria including, inter-alia, particle distribution, particle orientation, etc., a correct sample thickness may be a mandatory prerequisite.

In conventional sample preparation, several preparation steps are typically performed manually such that preparation results may lack precision and/or reproducibility. Accordingly, with such conventional sample preparation, extensive screening may often be necessary to find a grid or a part of a grid with adequate sample thickness e.g. in the grid of the CryoEM sample holder. Therefore, for example many CryoEM platforms may propose users screening their grids on medium resolution microscopes in order to maximise a time effectively used for data collection on their expensive and highly booked high-resolution microscopes. Even in this scheme, grid screening may become a bottleneck, wherein this is particularly true in facilities that open their services to non-expert users.

It was therefore an aim leading to the present invention to further develop sample preparation for CryoEM purposes. Particularly, it was intended to develop a semi or fully automated CryoEM grid preparation machine and method that preferably may include sample quality control.

Basically, it was an idea to use an existing high precision thickness measurement method and to further develop it such that it may beneficially be applied for measuring thicknesses of samples to be used in CryoEM. Specifically, it was an idea to use a sample thickness measuring unit which may determine a thickness of a sample based on interferometry measurements with a laser beam transmitted through the sample and to adapt it to the specific requirements encountered upon preparing samples to be used in CryoEM. Therein, the sample preparation process may include the interferometric measurement of the thickness of the sample during the preparation phase and after sample vitrification.

Particularly, it may be a goal to control the quality of a sample grid in terms of ice thickness and to, optionally, provide information about a sample thickness distribution throughout the grid of a sample holder. Such information may be supplied to the microscope in order to rapidly access those parts of the grid which have optimal sample thickness. In principle, such final thickness measurement may also be used to control grids prepared manually, for quality control and/or to supply sample thickness maps to electron microscope.

However, it has been observed that, while optical thickness measurement techniques using interferometry measurements are in principle able to provide very high precision down to a nanometer range, these measurement techniques may be problematic when applied at cryogenic temperatures. Particularly, it has been found that even slight temperature fluctuations, temperature inhomogeneities and/or temperature gradients may significantly influence the accuracy of such optical thickness measurement techniques.

Consequently, first attempts to apply optical interferometry techniques for measuring CryoEM sample thicknesses where not successful. For example, measurement conditions where insufficiently stable upon the measured sample being cooled to cryogenic temperatures such that interference patterns could not be evaluated successfully.

It was therefore an approach described herein to develop a specific cryostat which may be used upon measuring sample thicknesses with interferometry techniques at cryogenic temperatures. According to the first aspect of the invention, such cryostat shall comprise a coolant reservoir and a sample observation unit. The coolant reservoir may serve for storing liquid coolant to be used for keeping the sample at cryogenic temperatures in the observation volume. The sample observation unit may be specifically adapted such that, using the sample observation unit, characteristics of the sample may be observed, such observed characteristics possibly allowing deriving information about the thickness of the sample.

Specifically, the coolant reservoir may comprise a vessel enclosing a storage volume in which the liquid coolant may be stored. The liquid coolant may be a liquid which boils already at cryogenic temperatures at about or below 150 K (−123° C.). For example, the liquid coolant may be liquid nitrogen having a boiling temperature of about 77 K (−196° C.).

The vessel of the coolant reservoir comprises walls being thermally insulated with a thermal reservoir insulation layer. Due to such thermal insulation, the liquid coolant may be stored within this vessel at temperatures below 150 K for sufficiently long durations of for example several minutes to several hours, i.e. for example at least for ten minutes or at least one hour, without the liquid coolant being heated to above 150 K due to heat exchange with its ambience and/or without significant portions of the liquid coolant being heated to or above its boiling temperature. For such purpose, the thermal reservoir insulation layer may be similar to insulation layers used at conventional cryostats or Dewar vessels. Optionally, a system for refilling the reservoir with coolant may be provided. Such system may be semi- or fully automated.

In principle, the vessel of the coolant reservoir may be substantially closed and/or the thermal reservoir insulation layer may cover an entire surface of the vessel. However, as further explained below, it may be preferable to have the coolant reservoir and its vessel being open at an upper side such that, on the one hand, the sample observation unit may be easily partially inserted into the liquid coolant comprised in the coolant reservoir, part of its thermal tube plunging in the liquid coolant and, on the other hand, liquid coolant may be easily filled into the storage volume in the coolant reservoir.

The sample observation unit may be configured such that, on the one hand, a sample, the thickness of which is to be measured, may be inserted into the observation volume inside the sample observation unit and that, on the other hand, the sample in the observation volume of the sample observation unit may be maintained at cryogenic temperatures of below 150 K. As further characteristics, the sample observation unit may be configured such that the sample in the observation volume may be accessible for interferometry thickness measurements.

For such purpose, the sample observation unit may comprise a high thermal conductivity tube, a thermal tube insulation layer and a light transparent, low thermal conductivity sample observation window arrangement.

The tube has walls enclosing a tube volume including the observation volume. For example, the tube may be cylindrical. Alternatively, the tube may have any other elongate hollow structure with a circular or noncircular cross-section. The tube may have a constant cross-section. Alternatively, the cross-section may vary along the length of the tube. For example, the tube may have a length of between 5 cm and 10 cm and a diameter of between 5 mm and 10 mm.

One end of the tube, referred to herein as "distal end", should be such that part of it may plunge in the liquid coolant to take the temperature of the liquid coolant and, part of it may be open such that gas evaporated from the liquid coolant may flow through the observation volume and exits at its opposing second end, referred to herein as proximal end. The distal end of the tube may be open along its entire cross-section or only along parts of its cross-section.

The proximal end of the tube may also be open such that for example the sample to be measured may be inserted into the tube at this proximal end. Accordingly, an opening at the proximal end should have a sufficient cross-section such as to enable inserting the sample or the grid holding the sample into the tube towards the observation volume.

At its shell, the tube has two lateral openings in the tube walls. The openings are arranged at opposing sides with regard to the observation volume. The lateral openings may be through-holes through the tube wall. The lateral openings may have a cross-sectional area being sufficiently large such that a laser beam typically used for interferometric measurements may be transmitted through the lateral openings and such that it doesn't or slightly obstruct a vision cone of an objective of the measuring device. For example, the lateral openings may have a cross-sectional area of at least 1 mm$^2$, preferably at least 4 mm$^2$ or at least 10 mm$^2$ or even at least 25 mm$^2$. Preferably, the lateral openings have a cross-section area of no more than 200 mm$^2$, preferably no more than 100 mm$^2$.

The walls of the tube are covered at the external side with the thermal tube insulation layer. For generating a homogeneous temperature throughout the tube and/or for ease of construction, it may be preferred to have no thermally insulating cover layer at an internal side. The thermal tube insulation layer at the external side may be structurally similar and/or may have similar characteristics as the thermal reservoir insulation layer. Particularly, the thermal tube insulation layer may be thick enough and/or may be made with a thermally insulating material such as to substantially thermally isolate the inside of the tube from its outside environment. Particularly, the thermal tube insulation layer may be configured such as to prevent excessive heat transfer from an environment to the inside in the tube volume and particularly in the observation volume.

The thermal tube insulation layer comprises two openings. These openings may be arranged adjacent to the lateral openings in the tube walls. Particularly, the openings in the thermal tube insulation layer may have same or similar geometry and/or cross-section as the lateral openings in the tube. Accordingly, a laser beam may be transmitted through a succession of the lateral openings in the tube walls being intermediate to the openings in the surrounding thermal tube insulation layer.

The window arrangement comprises two windows with two panes. Each pane is arranged at one of the openings in the thermal insulation layer. Accordingly, the panes may be arranged at opposite sides with respect to the observation volume. Furthermore, the panes are transparent to laser light. Particularly, the panes may be transparent to laser light typically used in interferometry measurement techniques. For example, the panes may be made from a material being transparent in an electromagnetic wavelength range from 200 nm to 3 µm or any partial wavelength range thereof.

Accordingly, one or more laser beams used in interferometry thickness measurement techniques may be transmitted through the window arrangement and through the sample located within the observation volume between the panes of the window arrangement.

Furthermore, a thermal conductivity of the panes of the windows arrangement should be significantly lower than the thermal conductivity of the tube accommodating the windows arrangement. While the tube shall conduct the cryogenic temperature of the coolant in order to establish a high thermal homogeneity throughout the inner volume of the tube, the window arrangement shall establish sufficient thermal insulation against environmental temperatures outside the tube in a similar way as is established with the thermal insulation at the outer side of the tube. For example, thermal conductivity of the material of the window panes may be at least ten times, preferably at least 100 times or even at least 1000 times lower than thermal conductivity of the material of the tube.

In the proposed cryostat, the distal end of the tube of the sample observation unit may extend into the storage volume of the coolant reservoir. For example, the tube may be arranged above the coolant reservoir and may be oriented for example in a vertical direction such that its lower distal end or a part of it reaches down into the storage volume of the coolant reservoir. Accordingly, liquid coolant comprised in this storage volume may be in contact at least with a part of the distal end of the tube such as to cool down the tube volume and the observation volume comprised in the tube.

Upon measuring the thickness of a sample for example for CryoEM purposes, an embodiment of the described cryostat may be used to keep the sample at cryogenic temperature in a way such that any optical interferometry thickness measurements are not excessively perturbed.

Therein, upon filling a liquid coolant such as liquid nitrogen into the storage volume of the coolant reservoir, this liquid coolant at least partially enters and/or is in contact with the distal end of the tube. Accordingly, a gentle low-temperature coolant gas flow may be established through the tube of the sample observation unit. The coolant gas flow may be established upon portions of the liquid coolant evaporate and generate a very cold gas flow throughout the tube of the sample observation unit. The flow rate of the coolant gas flow may be governed by the thermal losses of the cryostat that evaporate the cooling liquid or controlled by a heating element inside the cryostat.

As this low-temperature coolant gas flow may have low temperatures at or significantly below 150 K, it may effectively cool down the observation volume in the tube of the sample observation unit. Accordingly, when a sample is inserted into the observation unit, the sample may be held at such cryogenic temperatures below 150 K.

Therein, due to the structure and characteristics of the sample observation unit, temperature fluctuations, temperature inhomogeneities and/or temperature gradients in the observation volume and particularly in the sample comprised in this observation volume may be limited to an extend where they do not excessively perturb any precise sample thickness measuring process.

Finally, the thickness of the sample may be measured by transmitting a laser beam through the window arrangement of the sample observation unit and determine the sample thickness based on interferometry measurements with the transmitted laser beam. For such purpose, known interferometry techniques and/or devices may be applied. Such interferometry techniques may enable thickness measurements with a precision of a few nanometers or below, in specific cases even with a precision of 1 nm or below.

According to an embodiment, in order to further improve applicability of the sample thickness measuring arrangement proposed herein, its sample thickness measuring unit may be configured for determining the sample thickness at various locations throughout the sample and for providing a two-dimensional map representing the determined sample thickness.

For an embodiment of the thickness measuring method proposed herein, this means that the sample thickness may be determined at various locations throughout the sample and a 2-dimensional map representing the determined sample thicknesses may be provided.

In other words, the sample thickness measuring unit may not only be adapted to measure the thickness of the sample at one single location but to measure such thickness at various neighboring locations. A representation of the measured thicknesses may be provided in a form of a 2-dimensional map presented in a plane perpendicular to the direction of the laser beam. Such map may comprise a multiplicity of pixels in a 2-dimensional matrix, each pixel representing the thickness of the sample in one small partial area.

For example, the sample thickness measuring unit may emit a laser beam having a substantial cross-section and may then, after transmission of the laser beam through the sample, analyze optical interferences in the transmitted laser beam e.g. with a reference laser beam at various sample locations. Such interferences generally result for example from phase shifts upon the laser beam being transmitted through the sample. For example, optical interferences may be detected at various pixels along a 2-dimensional surface of a laser beam detector of the sample thickness measuring unit. Based on such information about the optical interferences occurring between a reference laser beam and the laser beam transmitted through various locations of the sample, the 2-dimensional map representing the determined sample thicknesses may be provided.

Alternatively, the laser beam may be scanned in a direction perpendicular to the beam direction and multiple thickness measurements at different locations throughout the sample may be obtained successively. Again, a 2-dimensional map representing the local thicknesses may be determined.

The information included in such 2-dimensional map may then be used for example for determining those samples in a grid held e.g. by a CryoEM sample holder which have a suitable thickness for CryoEM analysis. In other words, based on the information contained in the 2-dimensional map, it may be simplified to find those areas in a grid at which the thicknesses of the samples are suitable for CryoEM analysis.

According to an embodiment of the cryostat, the tube of the sample observation unit is made with metal. In other words, the tube may partly or completely consists of metal. Particularly, at least a surface directed to the tube volume inside the tube is made of metal. Such metal may have good thermal conductivity characteristics. Accordingly, upon the tube being introduced with its distal end into the liquid coolant, cryogenic temperatures may be transferred throughout the tube towards the observation unit, thereby effectively cooling the sample inserted into the observation unit. Particularly, excessive temperature fluctuations and/or temperature gradients throughout the tube may be avoided due to the high thermal conductivity of its metal material. Furthermore, metals are generally mechanically stable materials and may therefore provide the tube with sufficient mechanical stability and/or stiffness.

Particularly, the tube may be made with copper, i.e. the tube may consist of or may at least comprise copper. Copper is a metal having superior thermal conductivity characteristics and may be provided at relatively low costs.

According to a further embodiment of the cryostat, the panes of the window arrangement in the sample observation unit may be made with glass or with transparent plastics, i.e. the pane may consist of or may at least comprise glass or transparent plastics. Glass is generally highly transparent to laser beams. Similarly, transparent plastics such as polyester may be highly transparent to laser beams. Furthermore, glass and transparent plastics may have highly thermally insulating characteristics. For example, polyester may have even better thermal insulation properties than glass. Accordingly, panes made of glass or transparent plastics may act highly thermally insulating to a similar extend as the thermal tube insulation layer. Thus, even though the panes interrupt the thermal insulation provided by the thermal tube insulation layer in the areas of openings adjacent to the observation volume, no local thermal leaks are generated as the panes themselves may provide for a sufficient thermal insulation. Accordingly, no excessive temperature fluctuations or temperature gradients are induced at the level of the window arrangement in the observation volume, and/or no water condensation appears on the sides of the windows exposed to ambient air.

Particularly, according to an embodiment, the panes may have a thickness of more than half of a thickness, or even more than an entire thickness, of the thermal tube insulation layer. Having such significant thickness, the panes may provide for sufficient thermal insulation in the area of the window arrangement. This may apply even though the material of the panes may not have the same very good thermal insulation characteristics as the material of the thermal tube insulation layer.

According to a specific embodiment, the panes may be hollow. In other words, the panes may not be formed entirely with a solid material but from a transparent material such as glass which may enclose a hollow volume. For example, the hollow volume may be filled with a water-free gas such as nitrogen, argon or a similar gas. Alternatively, a vacuum may be generated within the hollow volume. Thereby, thermal insulation characteristics of the panes may be further improved. Furthermore, with e.g. a nitrogen gas filled hollow window pane or with a vacuumed hollow window pane, less laser beam path variations may be induced as compared to fully solid window panes.

According to an embodiment, the cryostat may additionally comprise a sample holder being arranged and configured for holding a sample within the observation volume of the sample observation unit at a location within the tube between the opposing panes of the windows arrangement.

In other words, the cryostat may be provided with a specific sample holder. Using the sample holder, a sample or a grid holding such sample may be inserted and held within the tube of the sample observation unit. Specifically, the sample holder may position the sample in the observation volume in between the opposing panes of the window arrangement such that the sample's thickness may be measured using optical interferometry techniques upon transmitting a laser beam through the window arrangement.

Particularly, according to an embodiment, the sample holder may comprise tweezers for holding the sample in the observation volume. A pair of tweezers may have to elongate, substantially parallel legs mechanically connected at one end and being free at the opposing end. Tips at the free end may be small or even pointed such that small items such as a small grid comprising the sample may be gripped with the pair of tweezers. Optionally, there may be a fixation mechanism to fix the pair of tweezers in its gripping state. Furthermore, optionally, there may be a displacement mechanism for displacing the pair of tweezers. Accordingly, the pair of tweezers may be used for gripping the sample and then inserting the sample into the tube of the sample observation unit.

Particularly, according to an embodiment, the sample holder or the tweezers forming part of the sample holder may comprise a mechanically stabilizing core being made with a first material and an outer sheath enclosing at least a sample holding portion of the sample holder, the outer sheath being made with a second material having a lower thermal conductivity than the first material.

In other words, the sample holder or tweezers may have a core which mainly provides the stability required for the sample holder or tweezers but which may have a relatively high thermal conductivity. In order to prevent negative thermal effects due to such sample holder or tweezers being inserted into the cooled observation volume in the sample observation unit, such mechanically stabilizing core may be covered with the outer sheath being made with the material of lower thermal conductivity. Accordingly, the outer sheath may effectively thermally isolate the inner core of the sample holder from the cooled environment within the sample observation unit.

According to a specific embodiment, the sample holder may be made with plastics or a resin, i.e. it may consist of or may comprise plastics or a resin. The plastics or resin may be glass loaded. Generally, plastic or resin materials have a low thermal conductivity such that a sample holder made from or covered at its surface by such plastic materials may not or may at most minimally perturb thermal conditions within the sample observation unit.

For example, tweezers forming the sample holder may have a core made of glass or metal for stability reasons. The core may be covered by a layer of plastics or resin providing the required thermal insulation. Alternatively, only the tweezers' tip may be made with such thermally insulating material. For example, the tweezers' tip may be in glass loaded PEEK polymer or in FR4, G11 or other fiber loaded resins.

Finally, it should be noted that possible features and advantages of embodiments of the present invention are described herein in connection partly with respect to a cryostat, partly with respect to a sample thickness measuring arrangement and partly with respect to a method for measuring a thickness of a sample. One skilled in the art will realize that features described for one type of embodiments may be adapted, transferred, replaced and/or combined with other features described for the same type or another type of embodiments, in order to come to further embodiments of the present invention.

BRIEF DESCRIPTION OF THE DRAWINGS

Exemplary embodiments of the invention will be described in the following with reference to the attached drawing. Neither the drawing nor the specification shall limit the scope of the inventions and its embodiments.

The drawings are only schematic and not to scale. Same or similar elements are referenced with same reference signs throughout the drawings.

DETAILED DESCRIPTION OF EMBODIMENTS

Figure 1:
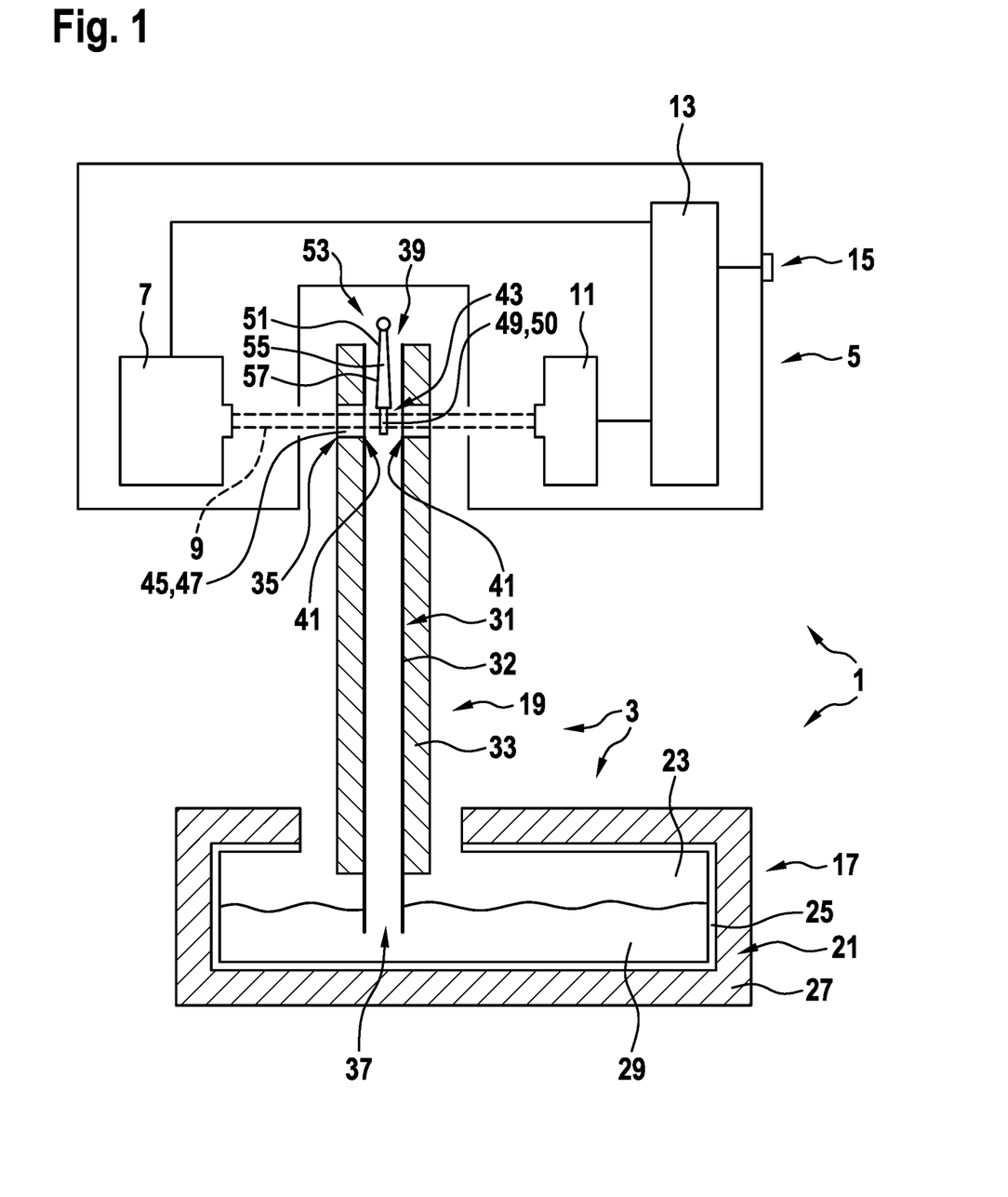
FIG. 1 shows a sample thickness measuring arrangement with a cryostat according to an embodiment of the invention.

FIG. 1 shows a sample thickness measuring arrangement 1 including a cryostat 3 according to embodiments of the present invention. Additionally to the cryostat 3, the sample thickness measuring arrangement 1 comprises a sample thickness measuring unit 5.

The sample thickness measuring unit is 5 configured for generating a laser beam 9 to be transmitted through a transparent sample 49 and for measuring phase shifts in the laser beam 9 after transmission through the sample 49, in order to thereby derive information about the thickness of the sample 49.

Such sample thickness measuring unit 5 could be a commercial digital holographic microscope (DHM). Digital holographic microscopy is a kind of digital holography applied to microscopy. Digital holographic microscopy distinguishes itself from other microscopy methods by not recording a projected image of the object but, instead, digitally recording the light wave front information originating from the object as a hologram. From such hologram, a computer may calculate the object image by using a numerical reconstruction algorithm. The image forming lens in traditional microscopy is thus replaced by a computer algorithm. Other closely related microscopy methods to digital holographic microscopy are interferometric microscopy, optical coherence tomography and diffraction phase microscopy. Common to all those methods is a use of a reference wave front to obtain amplitude and phase information. The information is recorded on a digital image sensor or by a photodetector from which an image of the object may be created or reconstructed by a computer. In contrast hereto, in traditional microscopy, no reference wave front is used but only intensity information is recorded and essential information about the object is generally lost.

In DHM, it is generally necessary to create interference patterns, i.e. a hologram. Accordingly, the illumination used in DHM needs to be coherent. Thus, a laser beam is generally applied as an illumination source. The laser beam is typically split into an object beam and a reference beam. The expanded object beam illuminates the sample to create the object wave front. After the object wave front is collected by a microscope objective, the object and reference wave fronts are joined e.g. by a beam splitter to interfere and create the hologram. Using the digitally recorded hologram, a computer may act as a digital lens and calculate a viewable image of the object wave front by using a numerical reconstruction algorithm. Accordingly, DHM may be used to provide a 2-dimensional image of the transparent object comprising, inter alia, information about the local thicknesses of the object. Optionally, the DHM may additionally comprise an objective including a lens such that the grid may be directly imaged.

The sample thickness measuring unit 5 comprised in the proposed sample thickness measuring arrangement 1 is only visualized very schematically. It comprises a laser 7 emitting the laser beam 9 and a light detector 11. The laser beam 9 has a relatively broad beam width and the light detector 11 comprises several detector pixels such as to generate 2-dimensional information regarding an amplitude and phase of detected laser light. The laser 7 as well as the light detector 11 are connected to a computing unit 13 which may generate 2-dimensional images or maps based on the information received by the light detector 11, such images or maps representing local widths at various locations throughout the sample 49. Such images or maps may be output at an output interface 15. Accordingly, the images or maps may be transmitted to other devices such as, for example, a CryoEM or the control computer of the sample preparation machine.

As already briefly indicated in the above "summary of the invention and of embodiments" section, good CryoEM data may only be obtained from particles embedded in a vitrified solution, i.e. in amorphous ice. Once vitrified, the samples should remain under 150 K, i.e. the temperature where vitrified ice transforms to hexagonal, cubic or crystalline ice. For practical reasons, the prepared sample grids are typically stored in liquid nitrogen at 77.36 K. Thickness measurements should then be operated in cryogenic conditions.

However, this has shown to be a major challenge. For example, digital holographic methods used in commercial devices for precisely measuring thicknesses of transparent samples are generally extremely sensitive to air movements and temperature gradients. This difficulty is amplified at cryogenic temperatures, where the measurement light path presents large temperature gradients that are difficult to stabilize.

The inventors have made a first tentative using a standard cryo jet to keep the sample grid at 100 K, while observed with a standard digital holographic microscope. However, this tentative was not successful. Interference patterns where highly unstable because of the fluctuating temperature gradient of the cold nitrogen flow in the cryo jet and the instability of the air/nitrogen window. No exploitable thickness map was obtained with this method. A tentative to separate the cold nitrogen flow from ambient air did not significantly improve the results.

Consequently, the inventors have searched for and developed a specific cryo observation setup that does not perturb the optical thickness measurement. In this setup, the sample grids 50 are held with a sample holder 53 comprising a tweezer 51 in a tube 31 in which a gentle laminar flow of nitrogen gas at about 80 K is established. An observation window arrangement 35 lets the laser beam 9 of the digital holographic microscope pass through the sample 49.

For such purpose, a special cryostat 3 has been developed. The cryostat 3 comprises a coolant reservoir 17 and a sample observation unit 19.

The coolant reservoir 17 comprises a vessel 21 enclosing a storage volume 23. Therein, walls 25 of the vessel 23 are thermally insulated with a thermal reservoir insulation layer 27. Due to such insulation, liquid coolant 29 may be stored within the coolant reservoir 17 at cryogenic temperatures below 150 K.

The sample observation unit 19 comprises a tube 31, a thermal tube insulation layer 33 and a window arrangement 35.

The tube 31 comprises tube walls 32 and is open both at its distal end 37 and at its proximal end 39. The distal end 37 of the tube 31 is arranged within the storage volume 23 of the coolant reservoir 17 such that portions of the liquid coolant 29 may enter the inside of the tube 31 and/or thermally contact the distal end 37 of the tube 31. Accordingly, liquid coolant 29 may cool the tube 31 and may partially evaporate such as to establish a gentle flow of low-temperature coolant gas through the tube 31.

Preferably, the tube 31 is made of a metal such as copper having a high thermal conductivity. An external side of the tube 31 is covered with the thermal tube insulation layer 33 such as to minimize any thermal losses. Accordingly, thermal losses, thermal fluctuations and/or thermal gradients throughout the tube 31 may be minimized.

Close to its proximal end 39, the tube 31 comprises two lateral openings 41. The lateral openings 41 are arranged at opposite sides of the tube 31 and enclose an observation volume 43 in between. Adjacent to the openings 41 in the tube 31, openings 45 are also provided within the thermal tube insulation layer 33. The window arrangement 35 comprises two thick panes 47 of glass or plexiglass. These panes 47 have a geometry complementary to the openings 45 in the thermal tube insulation layer 33 and therefore fill and thermally isolate these openings 45 in the region of the window arrangement 35.

In order to prepare for example biological samples 49 for CryoEM analysis, a solution comprising the samples 49 is dispensed on a grid 50 and is then vitrified e.g. in liquid ethane. The grid 50 with the vitrified samples 49 is then introduced into the observation volume 43 in the tube 31 of the cryostat 3.

Being held in the low-temperature coolant gas flow flowing through the tube 31, digital holographic microscope measurements may be performed for obtaining 2-dimensional information of thicknesses of the samples 49.

A critical point herein may be the approach used to hold the samples 49 or, more precisely, the grid 50 with these samples 49, and to introduce it into the observation volume 43 in the tube 31. In order to obtain a perturbation-free measuring environment, a sample holder 53 comprises tweezers 51 for holding and, optionally, displacing the grid 50 with the samples 49. Even though such tweezers 51 may have thin tips, it was observed that metallic tweezers 51 may drive enough heat to the samples 49 to modify a density of the coolant gas flow around the grid 50 and to, thereby, alter the thickness measurements.

Accordingly, measures where realized for minimizing thermal influences created by the sample holder 53. For such purpose, tweezers 51 made with plastics (e.g. glass loaded PEEK) have been used for holding the grid 50 with the samples 49. Optionally, such tweezers 51 may have a stabilizing core 55 being mechanically stable. For example, such core 55 may be made from glass. A surface of this core 55 may be covered with an outer sheath 57 of plastics. With such arrangement, heat transfer could be minimized and consequently does not perturb the laminar coolant gas flow through the observation volume 43.

With the described setup, the creation of a thickness map of the grid 50 comprising the samples 49 with acceptable noise was possible. In fact, using the sample observation unit 19 of the cryostat 3 proposed herein and coupling such sample observation unit 19 to the sample thickness measuring unit 5 comprising a commercial digital holographic microscope, it was shown to be possible to measure the thickness of a vitrified sample 49 on a CryoEM grid 50 with a precision of a few nanometers and to produce a sample thickness map over a whole grid 50.

Such thickness map could be used to reject grids 50 with inadequate sample thickness and/or to directly access areas of optimal sample thicknesses during CryoEM analysis. Consequently, the proposed system could make CryoEM pipelines, comprising sample preparation, followed by screening and then followed by data collection, more efficient and CryoEM platforms more productive.

The proposed approach could be realized as a stand-alone machine to control the quality of already prepared sample grids. Alternatively, a flexible inspection unit could be provided that could be adapted to existing in-line sample preparation machines.

It shall finally be mentioned that digital holographic microscopy may not only be used for measuring sample thicknesses after vitrifying the sample. Additionally or alternatively, DHM may also be applied for measuring a thickness of a sample before cooling down the sample to cryogenic temperatures. For example, in a modified approach, samples may be prepared by dispensing sample solution onto a CryoEM grid, then possibly removing any excessive sample solution from the CryoEM grid and then measuring the thickness of the non-frozen samples using interferometry measurements such as DHM. Optionally, the structure and/or thickness of the samples may then be modified in case a non-suitable thickness and/or an inhomogeneous thickness distribution is observed. If the DHM provides satisfying results for the sample thicknesses and/or thickness distribution throughout the CryoEM grid, the samples may then be vitrified. For example, the samples may be cooled down to cryo temperatures by submitting the CryoEM grid to a flow of very cold ethane. After such vitrifying, the thickness of the sample may then be verified using the approach described herein by measuring the thickness e.g. with DHM while the CryoEM grid is positioned within the observation volume of the cryostat described herein.

Figure 2:
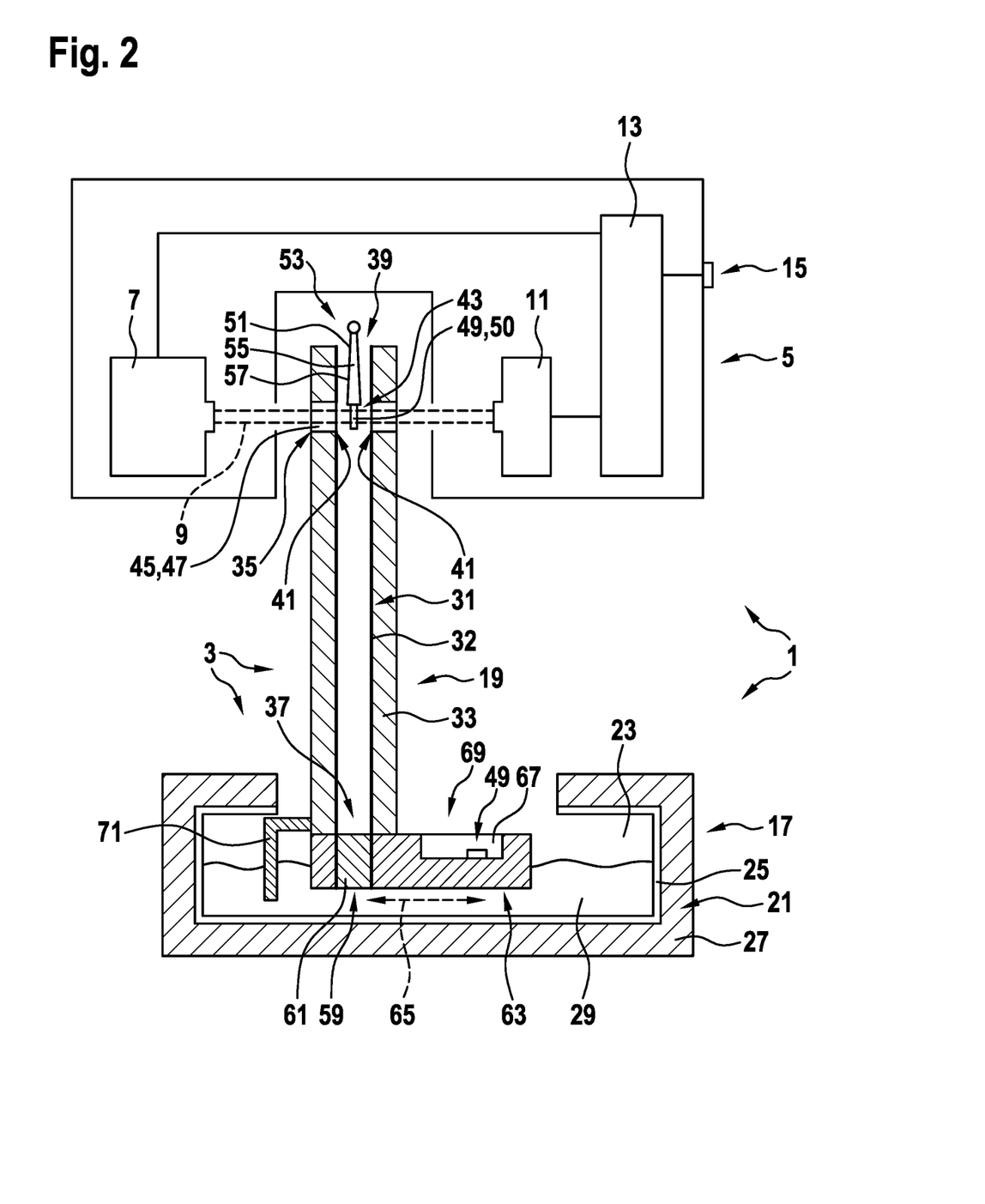
FIG. 2 shows a sample thickness measuring arrangement with a cryostat according to an alternative embodiment of the invention.

FIG. 2 shows a sample thickness measuring arrangement 1 including a cryostat 3 according to an alternative embodiment of the present invention. Structural features and functionalities generally correspond to those described for the embodiment shown in FIG. 1. A main difference between the embodiments in FIG. 1 and FIG. 2 is realised at the distal end 37 of the tube 31.

In the embodiment of FIG. 1, this distal end 37 is completely open, i.e. the tube walls 32 of the tube 31 plunge into the liquid coolant 29 with an inside volume of the tube 31 being unobstructed, thereby establishing a direct gas flow connection between the liquid coolant 29 and the inside volume of the tube 31. Accordingly, cool gas evaporating from the liquid coolant 29 may directly enter the inside volume of the tube 31.

However, it has been observed that such cool gas evaporating from the liquid coolant 29 may have an inhomogeneous gas flow distribution and/or gas flow turbulences. Temporal and/or spatial inhomogeneities in a cooling effect of such inhomogeneous and/or turbulent coolant gas flow may affect sample thickness measurements performed with the sample thickness measuring arrangement 1. Accordingly, such measurements may, under certain circumstances, suffer from some excessive measurement noise.

In order to minimise such measurement noise, a gas flow homogenator 59 may be arranged at and/or inside the tube 31, for example inside or upstream of the distal end 37 of the tube 31. Such gas flow homogenator 59 may be configured such as to reduce inhomogeneities and/or turbulences in a coolant gas flow in the tube 31. In other words, the homogenator 59 may be configured and arranged for reducing at least one of inhomogeneities and turbulences within a flow of coolant gas throughout the tube 31 in an area at and upstream of the observation volume 43.

For example, the gas flow homogenator 59 may be or may comprise a foam 61. Such foam 61 may be an open-cell foam 61 such that gas may flow throughout the foam 61. Accordingly, gas evaporating from the liquid coolant 29 may traverse the gas flow homogenator 59 by flowing through the foam 61. On such gas flow path, a drag is generated in the gas flow. Thereby, inhomogeneities and/or turbulences in the gas flow may be minimized. Thus, upon arriving at the observation volume 43, the substantially homogeneous and laminar coolant gas flow may continuously and homogeneously cool the sample 49 comprised in the observation volume 43.

In order to simplify a handling of the sample thickness measuring arrangement 1 and, particularly, in order to simplify charging and/or discharging a sample 49 into or from such arrangement 1, a drawer 63 or cartridge is provided inside the coolant reservoir 17. The drawer 63 may be made with a highly thermally conductive material such as a highly thermally conductive metal. The drawer 63 may be in thermal contact with the liquid coolant 29. The drawer 63 may be displaced horizontally as indicated with the dashed arrow 65.

Furthermore, the tube 31 may also be in thermal contact with the liquid coolant 29. For example, a plunger 71 may be provided at the distal end 37 of the tube 31. The plunger 71 may be made with a highly thermally conductive material such as a highly thermally conductive metal. Such plunger 71 may extend from the distal end 37 of the tube 31 down into the liquid coolant 29 such as to cool down the tube 31.

Close to one lateral end, the drawer 63 comprises a vertical through-hole in which the foam 61 of the homogenator 59 is arranged. Therein, a lower end of the through-hole is lower than a level of the liquid coolant 29 within the storage volume 23. An upper end of the through-hole is arranged adjacent to the distal end 37 of the tube 31. Accordingly, liquid coolant 29 may enter the through-hole from below and gas evaporating from such liquid coolant 29 may be transmitted, after having passed the foam 61 of the homogenator 59, into the inside volume of the tube 31.

Close to an opposite lateral end, the drawer 63 comprises an accommodation volume 67. In such accommodation volume 67, one or more samples 49 may be arranged and stored.

In a first configuration, as shown in FIG. 2, the drawer 63 may be arranged such that the homogenator 59 is situated adjacent to the distal end 37 of the tube 31. In such first configuration, the accommodation volume 67 is arranged underneath an access opening 69 provided at the upper side of the coolant reservoir 17. Accordingly, a user may put a sample 49 through the access opening 69 into the accommodation volume 67 such as to store the sample 49 in the cooled accommodation volume 67 of the drawer 63 plunged into the liquid coolant 29. Then, in order to charge the sample 49 into the sample thickness measuring unit 5, the drawer 63 may be laterally displaced (along the arrow 65) such that the accommodation volume 67 is arranged underneath the distal end 37 of the tube 31. In such second configuration, the sample 49 may be taken out of the accommodation volume 67 using for example the tweezer 51. For example, the tweezer 51 may grab the sample 49 in an automated motion and may transfer of the sample 49 into the observation volume 43 for measuring its thickness. Upon having transferred the sample 49 into the observation volume 43, i.e. before starting the actual measuring procedure, the drawer 63 may be laterally displaced back to its first configuration such that any coolant gas flow into the tube 31 has to cross the homogenator 59 before entering the tube 31.

Finally, the term "comprising" does not exclude other elements or steps, and the indefinite article "a" or "an" does not exclude a plurality. The mere fact that certain measures are re-cited in mutually different dependent claims does not indicate that a combination of these measures cannot be used to advantage. Any reference signs in the claims should not be construed as limiting the scope.

LIST OF REFERENCE SIGNS 1 sample thickness measuring arrangement
3 cryostat
5 sample thickness measuring unit
7 laser
9 laser beam
11 light detector
13 computing unit
15 output interface
17 coolant reservoir
19 sample observation unit
21 vessel
23 storage volume
25 walls
27 thermal reservoir insulation layer
29 liquid coolant
31 tube
32 tube walls
33 thermal tube insulation layer
35 window arrangement
37 distal end
39 proximal end 41 openings in the tube
43 observation volume
45 openings in the thermal tube insulation layer
47 panes
49 samples
50 grid
51 tweezers
53 sample holder
55 core
57 outer sheath
59 homogenator
61 foam
63 drawer
65 arrow indicating drawer motion
67 accommodation volume
69 access opening
71 plunger

The invention claimed is:

1. Cryostat comprising:
a coolant reservoir for storing liquid coolant; and
a sample observation unit for observing characteristics of a sample;
wherein the coolant reservoir comprises a vessel enclosing a storage volume with walls of the vessel being thermally insulated with a thermal reservoir insulation layer such as to enable storing liquid coolant at temperatures below 150 K;
wherein the sample observation unit comprises:
a tube having tube walls enclosing a tube volume including an observation volume;
a thermal tube insulation layer; and
a window arrangement;
wherein the tube is open at a distal end and at a proximal end;
wherein the distal end of the tube is arranged within the storage volume of the coolant reservoir;
wherein the tube has two lateral openings in its tube walls at opposing sides with regards to the observation volume;
wherein the tube walls are covered at their external side with the thermal tube insulation layer;
wherein the thermal tube insulation layer has two openings adjacent to the openings in the tube walls, and
wherein the window arrangement comprises two opposing panes, each pane being arranged at one of the openings in the thermal insulation layer, the panes being transparent to light of a laser beam.

2. Cryostat according to claim 1, wherein the tube is made with metal.

3. Cryostat according to claim 2, wherein the panes are made with at least one of glass and transparent plastics.

4. Cryostat according to claim 2, wherein the panes have a thickness of more than half of a thickness of the thermal tube insulation layer.

5. Cryostat according to claim 1, wherein the tube is made with copper.

6. Cryostat according to claim 5, wherein the panes are made with at least one of glass and transparent plastics.

7. Cryostat according to claim 5, wherein the panes have a thickness of more than half of a thickness of the thermal tube insulation layer.

8. Cryostat according to claim 1, wherein the panes are made with at least one of glass and transparent plastics.

9. Cryostat according to claim 8, wherein the panes have a thickness of more than half of a thickness of the thermal tube insulation layer.

10. Cryostat according to claim 1, wherein the panes have a thickness of more than half of a thickness of the thermal tube insulation layer.

11. Cryostat according to claim 1, wherein the panes are hollow.

12. Cryostat according to claim 1, further comprising a sample holder being arranged and configured for holding a sample within the observation volume of the sample observation unit at a location within the tube between the opposing panes.

13. Cryostat according to claim 12, wherein the sample holder comprises tweezers for holding the sample in the observation volume.

14. Cryostat according to claim 12, wherein the sample holder comprises a mechanically stabilizing core being made with a first material and an outer sheath enclosing at least a sample holding portion of the sample holder, the outer sheath being made with a second material having a lower thermal conductivity than the first material.

15. Cryostat according to claim 12, wherein the sample holder is made with at least one of plastics, resin, glass loaded plastics and glass loaded resin.

16. Sample thickness measuring arrangement comprising:
a cryostat according to claim 1;
a sample thickness measuring unit being arranged and configured for transmitting a laser beam through the window arrangement of the sample observation unit and for determining the thickness of a sample based on interferometry measurements with the transmitted laser beam.

17. Sample thickness measuring arrangement according to claim 16, wherein the sample thickness measuring unit is configured for determining the thickness of the sample at various locations throughout the sample and for providing a 2-dimensional map representing the determined sample thicknesses.

18. Method for measuring a thickness of a sample, the method comprising:
providing a cryostat according to claim 1;
establishing a low temperature coolant gas flow through the tube of the sample observation unit of the cryostat;
inserting the sample into the observation volume of the sample observation unit; and
measuring the thickness of the sample by transmitting a laser beam through the window arrangement of the sample observation unit and determining the sample thickness based on interferometry measurements with the transmitted laser beam.

19. Method of claim 18, wherein the sample thickness is determined at various locations throughout the sample and a 2-dimensional map representing the determined sample thicknesses is provided.

20. Cryostat according to claim 1, further comprising a homogenator configured and arranged for reducing at least one of inhomogeneities and turbulences within a flow of coolant gas throughout the tube in an area at and upstream of the observation volume.

* * * * *